United States Patent
Neumann et al.

(10) Patent No.: US 9,739,372 B2
(45) Date of Patent: Aug. 22, 2017

(54) DRIFT CONTROL SYSTEM OF A WORK MACHINE AND METHOD THEREOF

(71) Applicant: DEERE & COMPANY, Moline, IL (US)

(72) Inventors: Bryon Neumann, Brantford (CA); Benjamin DiSabatino, Brantford (CA)

(73) Assignee: DEERE & COMPANY, Moline, IL (US)

(*) Notice: Subject to any disclaimer, the term of this patent is extended or adjusted under 35 U.S.C. 154(b) by 210 days.

(21) Appl. No.: 14/685,873

(22) Filed: Apr. 14, 2015

(65) Prior Publication Data

US 2015/0219213 A1 Aug. 6, 2015

Related U.S. Application Data (63) Continuation-in-part of application No. 13/328,084, filed on Dec. 16, 2011.

(51) Int. Cl.
| | |
|---|---|
| *F16H 61/20* | (2006.01) |
| *F16H 61/46* | (2010.01) |
| *F16H 61/4157* | (2010.01) |
| *F16H 61/4052* | (2010.01) |
| *F16H 61/439* | (2010.01) |
| *F15B 13/02* | (2006.01) |
| *B60W 30/18* | (2012.01) |

(52) U.S. Cl.
CPC ....... *F16H 61/20* (2013.01); *B60W 30/18118* (2013.01); *F15B 13/02* (2013.01); *F16H 61/4052* (2013.01); *F16H 61/4157* (2013.01); *F16H 61/439* (2013.01); *F16H 61/461* (2013.01); *F16H 2061/205* (2013.01)

(58) Field of Classification Search
None
See application file for complete search history.

(56) References Cited

U.S. PATENT DOCUMENTS

| | | | |
|---|---|---|---|
| 3,978,937 | A | 9/1976 | Chichester et al. |
| 4,543,786 | A | 10/1985 | Shuler |
| 6,085,811 | A | 7/2000 | Wiemeri et al. |
| 6,119,802 | A * | 9/2000 | Puett, Jr. ............. B60K 17/10 180/242 |
| 6,578,358 | B1 | 6/2003 | Schuh |
| 6,807,809 | B2 | 10/2004 | Schuh |
| 2007/0068320 | A1 | 3/2007 | Hastings |
| 2007/0069493 | A1 | 3/2007 | Sanders |
| 2013/0152564 | A1 | 6/2013 | Neumann et al. |
| 2014/0208934 | A1 | 7/2014 | Raszga et al. |

\* cited by examiner

*Primary Examiner* — Russell Frejd
(74) *Attorney, Agent, or Firm* — Taft Stettinius & Hollister LLP; Stephen F. Rost (57) ABSTRACT

A drift control method for a machine that includes a controller, a cutting tool, a motor having a motor shaft for driving a machine function, a control valve, and an operator control for commanding a machine function. The drift control method includes sensing a neutral position of the operator control, and when in the neutral position, further storing a first position of the motor shaft or cutting tool in the controller, detecting a change in position of the motor shaft or cutting tool with a sensor, determining a direction as a function of the change in position, and hydraulically controlling the motor shaft or cutting tool to the first position.

20 Claims, 9 Drawing Sheets

DRIFT CONTROL SYSTEM OF A WORK MACHINE AND METHOD THEREOF

RELATED APPLICATIONS

The present application is a continuation-in-part of U.S. application Ser. No. 13/328,084, filed on Dec. 16, 2011, which is hereby incorporated by reference in its entirety.

FIELD OF THE DISCLOSURE

The present disclosure generally relates to the field of work machines and more specifically to a system that can electronically or hydraulically compensate for drift of a machine.

BACKGROUND

When a machine with a hydrostatic transmission is in neutral on slopes, there is a tendency for it to 'drift' down the hill due to hydraulic leakage in the system. This leakage allows for a non-zero flow across the motor when the pump displacement is commanded to neutral. To minimize the drift of a machine with a hydrostatic transmission, operators tend to use dynamic braking by applying the static parking brake while the machine is drifting. This stops the drift but shortens the life span of the brakes.

Alternative hydraulic systems, such as open loop transmissions, often utilize counterbalance valves incorporated directly inside the track motor to minimize drift. Counterbalance valves accomplish this feature by maintaining a differential pressure on the travel motors with minimal leakage and therefore prevent noticeable motion or drift. This is generally a hydraulic solution and does not utilize electronic control. Counterbalance valves are undesirable in hydrostatic systems because of the added pressure drop and efficiency loss. Open loop systems can also introduce multifunction interference issues when multiple hydraulic systems request more flow than the pump for the open loop system can provide. Typically closed loop, hydrostatic systems are utilized where increased tractive effort and efficiency is a priority.

It would be desirable to have a system that can electronically hold a machine with a hydrostatic transmission at zero speed when the transmission is in neutral on slopes so that the machine does not drift. Being able to drive machines to zero speed on slopes can also reduce the need for dynamic braking on the machines (applying the static park brake while the machine is drifting) which will improve the brake life of the machines.

SUMMARY

A closed loop transmission and hill hold system for a machine is disclosed that includes a pump, a motor, a fluid leakage path between the motor and the pump, a motor shaft, a motor shaft sensor and a neutral sensor. The pump generates fluid flow and the motor is powered by the fluid flow from the pump. The motor shaft is coupled to the motor such that the motor rotates the motor shaft when powered by the fluid flow from the pump and the motor shaft rotates when an external torque is applied to the motor shaft. The motor shaft sensor detects movement of the motor shaft. The neutral sensor detects when the transmission is commanded to a neutral position. When the transmission is in the neutral position, the pump is not commanded by the transmission to generate fluid flow. When the neutral sensor detects the transmission is in the neutral position, the hill hold system can monitor the motor shaft sensor and command the pump to generate fluid flow in a direction and with a magnitude to cause the motor shaft to be stationary. The hill hold system can continuously monitor the motor shaft sensor and adjust the fluid flow. The motor shaft sensor can detect a rotational speed of the motor shaft, and when the neutral sensor detects the transmission is in the neutral position, the hill hold system can command the pump to generate fluid flow to cause the motor shaft to have a rotational speed of substantially zero.

The closed loop transmission and hill hold system can also include a parking brake timer and a parking brake delay value. The hill hold system can start the parking brake timer when the neutral sensor initially detects that the transmission is in the neutral position, and the hill hold system can activate the parking brake when the parking brake timer is greater than the parking brake delay value.

The closed loop transmission and hill hold system can include a parking brake sensor that detects when a parking brake is applied to the machine. The hill hold system can be turned off when the parking brake sensor indicates that the parking brake is applied to the machine.

A hill hold control method for a closed loop transmission of a machine is disclosed that includes sensing a neutral command for the transmission; and performing the following steps while the neutral command is sensed: sensing movement of a motor shaft; generating fluid flow to offset the movement of the motor shaft; and causing substantially zero movement of the motor shaft. Generating fluid flow to offset the movement of the motor shaft can include determining a direction and magnitude of fluid flow to offset movement of the motor shaft; and activating a pump to generate fluid flow in the determined direction and magnitude. The hill hold control method can maintain substantially zero movement of the motor shaft by repeating the steps of sensing movement; generating fluid flow and causing substantially zero movement.

The hill hold control method can also include starting a brake timer when the neutral command is initially sensed; comparing the brake timer to a brake delay value; and performing the following steps when the brake timer is greater than the brake delay value: activating the parking brake of the machine; and discontinuing maintaining substantially zero movement of the motor shaft by repeating the sensing movement; generating fluid flow and causing substantially zero movement steps. The hill hold control method can also include resetting the brake timer to zero when the parking brake is released or the machine is commanded out of the neutral position.

The hill hold control method can also include sensing when a parking brake is applied to the machine; and when application of the parking brake is sensed; discontinuing the steps to maintain substantially zero movement of the motor shaft.

A hill hold control method for a closed loop transmission of a machine is disclosed that includes sensing a neutral command for the transmission and performing the following steps while the neutral command is sensed: starting a brake timer when the neutral command is initially sensed; sensing movement of a motor shaft; generating fluid flow to offset the movement of the motor shaft and cause substantially zero movement of the motor shaft; comparing the brake timer to a brake delay value; when the brake timer is greater than the brake delay value, activating the parking brake of the machine and discontinuing the step of generating fluid flow to offset the movement of the motor shaft; sensing when a parking brake is applied to the machine; and when application of the parking brake is sensed; discontinuing the step of generating fluid flow to offset the movement of the motor shaft. Sensing movement of the motor shaft can be done by sensing the rotational speed of the motor shaft. The step of generating fluid flow to offset the movement of the motor shaft can include determining a direction and magnitude of fluid flow as a function of the sensed rotational speed of the motor shaft, and adjusting the direction and magnitude of fluid flow based on recurring readings of the sensed rotational speed of the motor shaft.

In a different example, a drift control method is provided for a machine. The machine. includes a controller, a motor having a motor shaft for driving a machine function, a control valve, and an operator control for commanding a machine function. The method includes sensing a neutral position of the operator control; and performing the following steps while the operator control is sensed in the neutral position: storing a first position of the motor shaft or cutting tool in the controller; detecting a change in position of the motor shaft or cutting tool with a sensor; determining a direction as a function of the change in position; and hydraulically controlling the motor shaft to the first position.

In one example, the drift control method can further include storing a drift control function in the controller; and enabling the drift control function to execute the performing step if the operator control is in the neutral position. In another example, the method can include sensing the operator control is in a position different from the neutral position; and disabling the drift control function. In a further example, the method can include continuously measuring the position of the motor shaft or cutting tool while the operator control is in the neutral position; and continuously adjusting the position of the motor shaft to remain substantially in the first position.

The drift control method can include providing a first solenoid to control rotation of the motor shaft in a clockwise direction and a second solenoid to control rotation in a counterclockwise direction; and energizing the first solenoid or the second solenoid based on a result of the determining step. The method may also include actuating the control valve in one of two directions based on the energizing step; detecting a new position of the motor shaft or cutting tool after the actuating step; comparing the new position to the first position; determining a second direction if the new position is different from the first position; and hydraulically controlling the motor shaft or cutting tool from the new position to the first position.

In this embodiment, the hydraulically controlling step can include hydraulically controlling motor shaft speed based on a magnitude of the change in position of the motor shaft. Alternatively, the hydraulically controlling step can include hydraulically controlling motor shaft speed based on one or more of a magnitude of the change in position of the motor shaft, actual fluid temperature relative to a threshold temperature, and load pressure on a work line of the motor.

In a related embodiment of drift control, a method is provided for controlling motor shaft drift due to fluid leakage of a machine. The method includes providing a controller, a control valve having a first solenoid and a second solenoid, a motor having a motor shaft for driving a machine function, a motor shaft sensor, and an operator control for commanding the machine function; detecting a neutral position of the operator control; sensing rotation of the motor shaft in a first rotational direction with the motor shaft sensor; and electrically controlling the control valve to rotate the motor shaft in a second direction, where the first direction is opposite the second direction.

In one example of this embodiment, the sensing step comprises sensing rotation of the motor shaft in the first rotational direction by an angular distance; and the electrically controlling step comprises electrically controlling the control valve to rotate the motor shaft in the second rotational direction by the angular distance. Moreover, the electrically controlling step can include comparing the angular distance to a threshold distance; and electrically controlling the control valve to rotate the motor shaft in the second rotational direction by the angular distance when the angular distance is greater than the threshold distance. In a further example, the sensing step comprises sensing rotation of the motor shaft in the first rotational direction by a first angular distance; and the electrically controlling step comprises electrically controlling the control valve to rotate the motor shaft in the second rotational direction by a second angular distance, the second angular distance being equal to or within approximately 90% of the first angular distance.

In this embodiment, the method can include continuously monitoring the motor shaft after the electrically controlling step; detecting rotational movement of the motor shaft in either the first or second direction; and commanding the control valve to control movement of the motor shaft in the direction opposite of the rotational movement. The method may also include storing a look-up table in the controller, the look-up table including electric current values relative to a load pressure on the motor and a fluid temperature; receiving a pressure signal from the sensing step; reading a current fluid temperature over a CAN link; determining an output current from the look-up table based on the pressure signal and current fluid temperature; and communicating the output current to a first solenoid or a second solenoid to execute the electrically controlling step. In a further example, the sensing step includes detecting a movement in a first direction of a cutting tool of the machine with the sensor; and the electronically controlling step includes controllably moving the cutting tool in a second direction, wherein the first direction is opposite the second direction.

In a further embodiment, a method is provided for controlling drift of a work machine. The work machine includes a controller, a control valve having a first solenoid and a second solenoid, a motor having a motor shaft for driving a machine function, a sensor, a pressure sensor, and an operator control for commanding the machine function. The method includes storing a drift control function and a look-up table in the controller, the look-up table including electric current values relative to a load pressure on the motor and a fluid temperature; enabling the drift control function if the operator control is in a neutral position; receiving a pressure signal from a work line on the motor indicative of rotation of the motor shaft in a first direction; reading a current fluid temperature over a CAN link; determining an output current from the look-up table based on the pressure signal and current fluid temperature; communicating the output current to a first solenoid or a second solenoid; and controlling the control valve to rotate the motor shaft in a second direction, where the first direction is opposite the second direction.

In one example of this embodiment, the method can include storing a maximum drift threshold in the controller; detecting rotation of the motor shaft with the sensor; determining a magnitude of change in position of the motor shaft during the detecting step; and continuously comparing the magnitude of change with the threshold. In a second example, the method can include hydraulically controlling motor shaft speed based on the magnitude of change in position of the motor shaft if the magnitude of change exceeds the threshold. In another example, the receiving step may include detecting fluid pressure at the work line of the motor with the pressure sensor; comparing the fluid pressure to a pressure threshold; and executing the controlling step if the fluid pressure exceeds the pressure threshold. In a different example, the method can include providing a second operator control in electrical communication with the controller; receiving a command from the second operator control; and adjusting the electric current values in the look-up table based on the command.

DETAILED DESCRIPTION

For the purposes of promoting an understanding of the principles of the novel disclosure, reference will now be made to the embodiments described herein and illustrated in the drawings and specific language will be used to describe the same. It will nevertheless be understood that no limitation of the scope of the novel disclosure is thereby intended, such alterations and further modifications in the illustrated devices and methods, and such further applications of the principles of the novel disclosure as illustrated therein being contemplated as would normally occur to one skilled in the art to which the novel disclosure relates.

Figure 3:
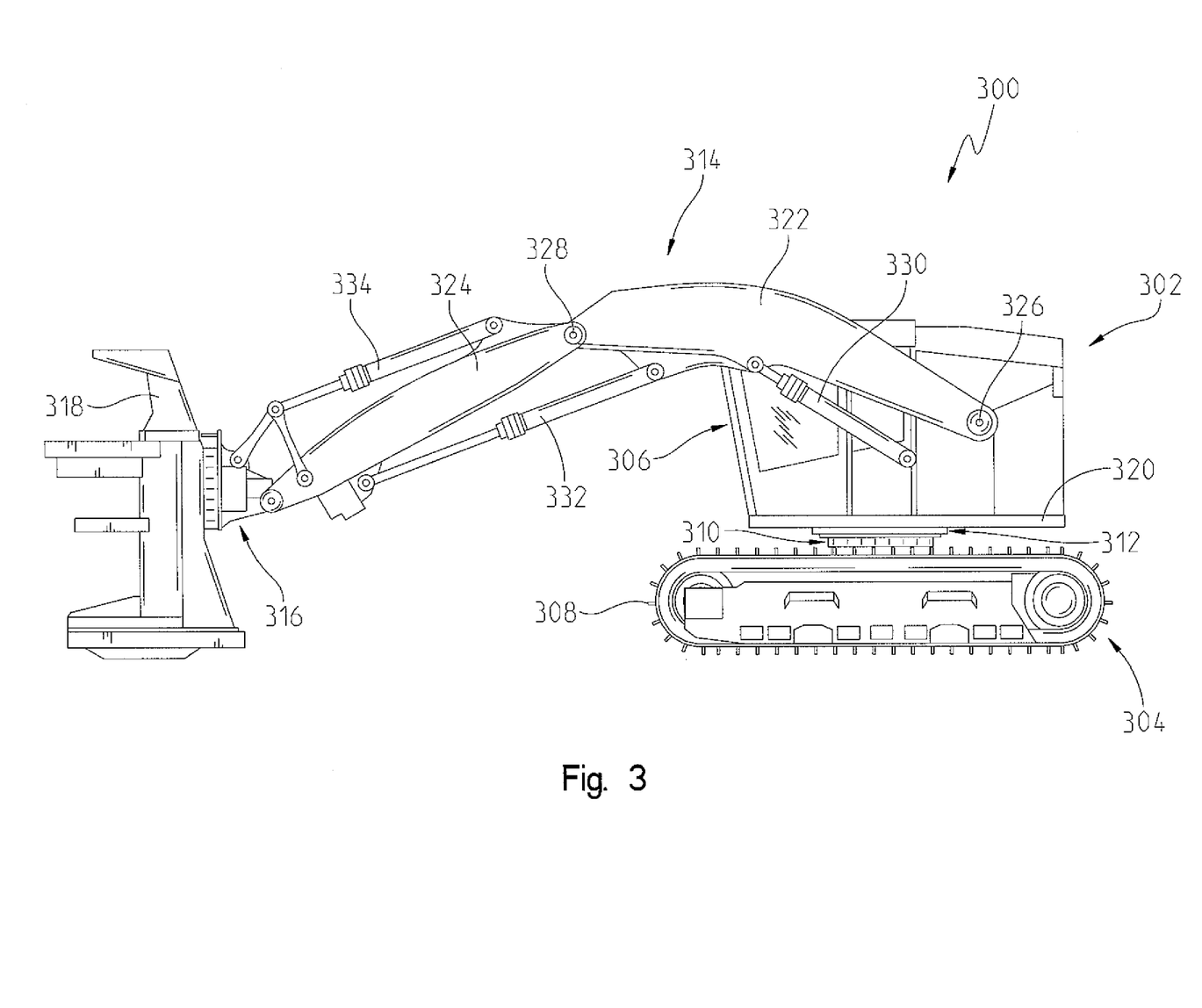
FIG. 3 is a side view of a work machine.

Referring to FIG. 3, an example of a work machine, such as a feller buncher 300, is shown. The present disclosure is not limited, however, to a feller buncher and may extend to other work machines in the construction, forestry, and agricultural industries such as an excavator, crawler, harvester, skidder, motor grader, or any other work machine. As such, while the figures and forthcoming description may relate to a feller buncher, it is to be understood that the scope of the present disclosure extends beyond a feller buncher and, where applicable, the term "machine" or "work machine" will be used instead. The term "machine" or "work machine" is intended to be broader and encompass other vehicles besides a feller buncher for purposes of this disclosure.

The machine 300 can include an upper frame assembly 302 which is supported by an undercarriage assembly 304. The upper frame assembly 302 can include a cab 306 in which an operator utilizes a plurality of controls (e.g., joysticks, pedals, buttons, screens, etc.) for controlling the machine 300 during operation thereof. The upper frame assembly 302 can also include an engine compartment that houses an engine such as a diesel engine which provides the motive power for operating the components associated with the machine 300. Both the cab 306 and the engine compartment can be supported by various frame members that form the upper frame assembly 302.

The undercarriage assembly 304 can include tracks 308 (e.g., one on a leftside of the machine and another on a rightside thereof) that engage and move along the ground during operation. The tracks 308 can be driven by a drive sprocket (not shown) and a front idler wheel (not shown) about which a track chain (not shown) is entrained. A hydraulic motor can operably drive the drive sprocket (which may form part of a high reduction gearset) so as to drive the track chain (not shown) thereby providing motive power for moving the machine 300.

The upper frame assembly 302 can be mechanically coupled to the undercarriage assembly 304 by a tilt mechanism and turntable assembly 310. The tilt mechanism and turntable assembly 310 can operably control the machine 100 to be rotated and tilted about one or more axes. A swing assembly 312, for example, may include one or more swing motors for driving rotation of the upper frame assembly 302 relative to the undercarriage assembly 304. Operation of the swing assembly 312 can further rotate a platform 320 of the upper frame assembly 302 relative to the undercarriage 304.

The work machine 300 may further include a boom assembly 314. The boom assembly 314 may include a first boom section 322 pivotably coupled to a second boom section 324. As shown in FIG. 3, one end of the first boom section 322 is pivotably coupled to the upper frame assembly 302 via a first pivot pin 326. An opposite end of the first boom section 322 is pivotably coupled at a second pivot pin 328 to a first end of the second boom section 324. The second boom section 324 can include a second end coupled to a wrist assembly 316. The wrist assembly 316 may include one or more hydraulic motors for powering a work element. As shown in FIG. 3, the work implement coupled to the wrist assembly 316 is a cutting head 318 for sawing and bunching trees.

The work machine 300 may also include a plurality of actuators for controlling the boom assembly 314 and cutting head 318. In the example of FIG. 3, the machine 300 includes a first hydraulic actuator 330, a second hydraulic actuator 332, and a third hydraulic actuator 334.

Electronic hill hold can be enabled by a shaft speed sensor that can detect the magnitude and direction of the motor shaft speed. Using this feedback, when a hydrostatic transmission is commanded to neutral and the park brake is not applied, this control system can drive and hold the machine at zero speeds, eliminating drift. Using integral control, this system can drive the machine to zero speed by stroking the pump in the opposite direction of motion and holding the command necessary to achieve zero speed. This control system can be applied to any machine with a closed-loop hydrostatic transmission.

Figure 1:
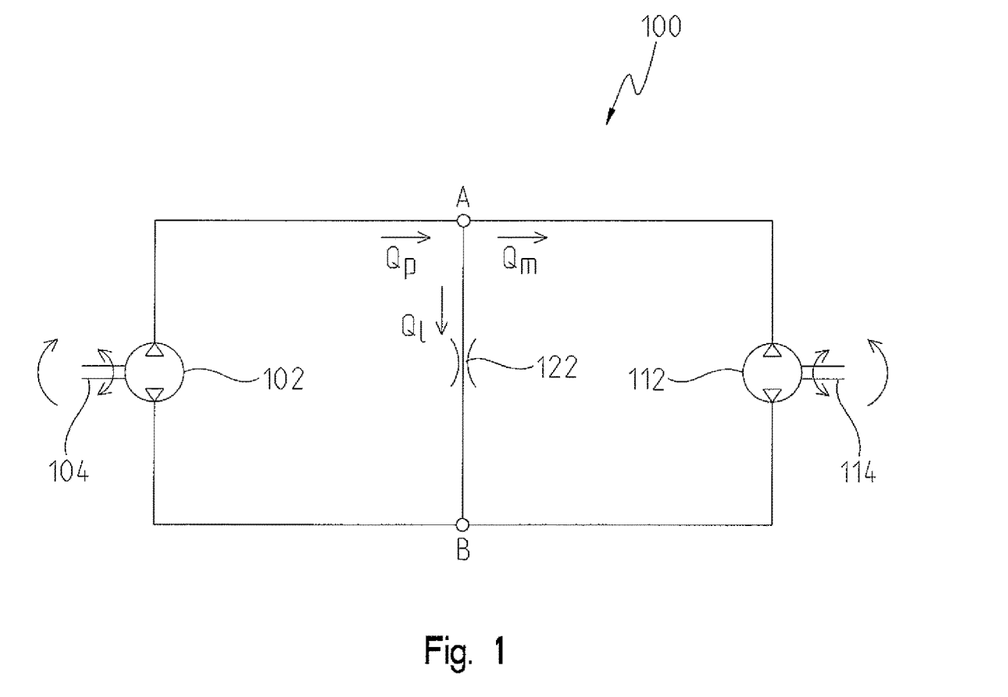
FIG. 1 is a simplified diagram of a closed loop, hydrostatic transmission circuit that includes a pump, a motor and a leakage path.

FIG. 1 shows a simplified diagram of a closed loop, hydrostatic transmission circuit 100 that includes a hydrostatic transmission pump 102, a hydrostatic transmission motor 112 and a leakage path 122 that each run between Node A and Node B. The pump 102 is coupled to a pump shaft 104, and the motor 112 is coupled to a motor shaft 114. The root cause and solution of hydrostatic neutral drift can by illustrated through nodal analysis of the simplified system 100.

The net oil flow at Node A when the pump is positively stroked is given by the following equation:

$$\Sigma Q_A = Q_p - Q_m - Q_l = 0 \qquad (1)$$

where $Q_p$ is the flow produced by the hydrostatic pump 102, $Q_m$ is the flow that is consumed by the hydrostatic motor 112, and $Q_l$ is a lumped parameter representative of the oil that leaks from various locations through the closed loop system 100 which is illustrated as a single leakage path 122 from Node A to Node B. The leakage path 122 from Node A to Node B represents volumetric inefficiency in the closed loop transmission.

When the hydrostatic pump 102 is returned to the neutral position, $Q_p$ is zero. If there is a load at the motor 112, it will act to 'pump' oil from the motor 112 back into Node A. In this situation, the oil flow at Node A becomes:

$$\Sigma Q_A = Q_m - Q_l = 0 \qquad (2)$$

Solving Eq. 2 for a positive leakage flow, the flow across the motor 112 will be equal to this leakage flow. The shaft speed of the motor 112 is given by the equation:

$$N_m = \frac{Q_m}{D_m} \qquad (3)$$

where $N_m$ is speed of the motor shaft 114 and $D_m$ is the displacement per revolution of the motor 112. Therefore, from Eq. 2 and 3, when the pump 102 is in neutral, the flow $Q_m$ across the motor 112 is approximately the same as the leakage flow $Q_l$. Because the hydrostatic motor 112 has a positive displacement, the motor flow $Q_m$ produces a non-zero shaft speed $N_m$ for the motor shaft 114. A motor shaft sensor can be used to detect the movement and/or speed of the motor shaft 114.

Using the relationship between flow and shaft speed in Eq. 3, the detected speed of the motor shaft 114 can be used as a feedback for a closed loop control system. The hydrostatic pump 102 can be stroked to a small displacement to counter the leakage flow $Q_l$ at Node A. If the pump flow $Q_p$ into Node A counters the leakage flow $Q_l$ out of Node A, then the motor flow $Q_m$ and the movement of the motor shaft 114 will be approximately zero. When the motor shaft 114 is coupled to a track of a machine, the hill hold control system can be used to substantially eliminate perceptible drift of the machine. This is especially true where there is a high gear ratio between the motor shaft 114 and the machine track.

By using the hill hold control, the brake control system for the machine can be simplified. The hill hold control can also extend the brake life of the machine since the brakes, for example friction disc brakes can be applied while the machine is at or close to zero-speed due to the hill hold control as opposed to while the machine is drifting down a hill without the hill hold control.

Figure 2:
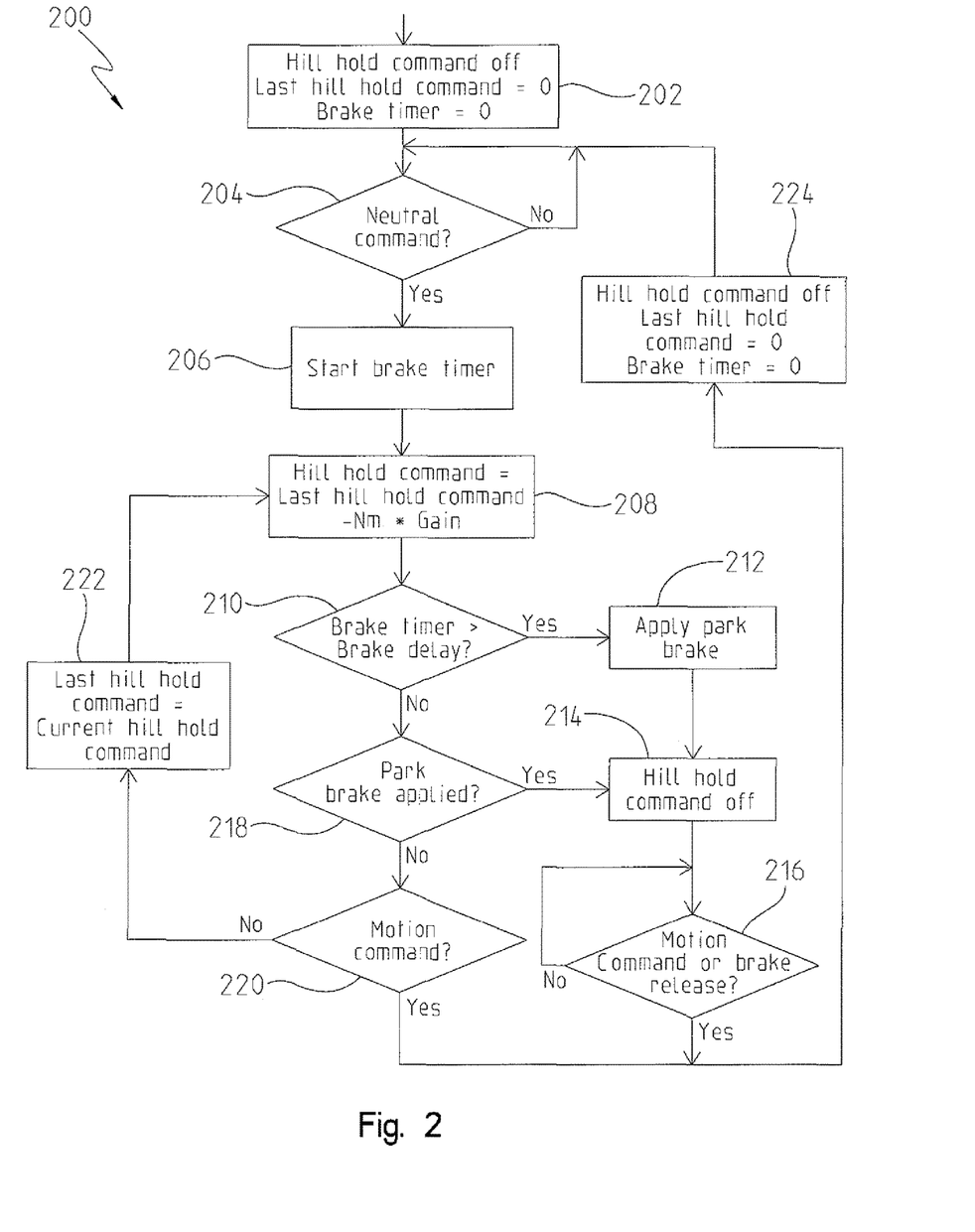
FIG. 2 is an exemplary control method 200 for a hill hold system.

FIG. 2 shows an exemplary control method 200 for the hill hold control system. At block 202, the hill hold command is turned off, the last hill hold command value is set to zero, and the brake timer is set to zero. Then at block 204, the control system waits for the operator to command the machine transmission to neutral. When the transmission is commanded to neutral, control is transferred to block 206.

At block 206, a brake timer is started and control passes to block 208. At block 208, a hill hold command is generated that equals the last hill hold command minus the motor shaft speed times a gain. The motor shaft speed, Nm, can be detected using a sensor. The last hill hold command is initially zero. The motor shaft speed is negative in the computation because the hill hold command value will be in the opposite direction of the motor shaft speed to compensate for the drift. In this way, the control system can compensate for drift whether it is in the forward or backward direction. The gain is selected to help keep the control smooth and stable. As will be understood from the flow diagram 200, for this exemplary embodiment the hill hold command value increases until the motor shaft speed is zero at which point the hill hold command remains steady until the park brake is applied or the operator issues a motion command for the machine. The hill hold command value is a command value to stroke the pump 102 to produce a flow $Q_p$ into Node A to compensate for the leakage flow $Q_l$, making the flow $Q_m$ through the motor 112 approximately zero. The leakage flow and drift can vary due to many factors, for example, the slope of the hillside, the weight of the machine, the wear of the various system components, etc. However, by sensing the rotation or speed of the motor shaft 114, all of these factors are compensated for regardless of their variations. From block 208 control passes to block 210.

At block 210, the system checks whether the brake timer is greater than a brake delay value. The brake delay value is the delay from when the transmission is commanded to neutral to when the parking brake is applied. An exemplary value of the brake delay can be 10 seconds, and of course the delay can be shorter or longer. When the brake timer is greater than the brake delay value, at block 212 the parking brake is applied, at block 214 the hill hold command is turned off, and at block 216 the control system waits for a motion command or parking brake release by the operator. When the brake timer is not greater than the brake delay value, control passes to block 218.

At block 218, the system checks whether the operator has applied the parking brake. If the parking brake has been applied, at block 214 the hill hold command is turned off, and at block 216 the control system waits for a motion command or parking brake release by the operator. If the parking brake has not been applied, control passes to block 220.

At block 220, the hill hold system is active and the control system checks whether the operator has issued a motion command for the machine. If the operator has not issued a motion command, at block 222 the last hill hold command value is set equal to the current hill hold command value and the control system returns to step 208 to determine if the hill hold command should be modified. If the operator has issued a motion command, control passes to block 224.

At block 216, the hill hold system is off, the parking brake is applied and the control system checks whether the operator has issued a motion command for the machine or has released the parking brake. The control system remains at block 216 until the operator issues a motion command or releases the parking brake. When the operator issues a motion command or releases the parking brake, control passes to block 224.

At block 224, the hill hold command is turned off, the last hill hold command value is set to zero, and the brake timer is set to zero. Then control passes to block 204 where the control system waits for the operator to command the transmission to neutral.

In addition to hill hold, this disclosure further addresses drift control. For example, if a work machine such as a feller buncher is positioned on a slope, gravitational forces may act on the machine and thereby induce drift. In some instances, a mechanical, static brake is unable to be applied if the machine is working. Moreover, a mechanical or frictional brake cannot be used to control drift in the swing assembly or wrist assembly due to risking damage to a gearbox if an induced torque is applied to either assembly. This may be the case if the felling head or cutting tool 318 of the machine 300 contacts a stump or ground as the undercarriage assembly 304 moves along the ground. This contact may induce a torque in the swing assembly 312, for example.

Thus, without using a brake to prevent drift, most conventional work machines have some amount of drift. A minimal amount of drift may not be problematic to the operator, but when maneuvering a tree, any amount of drift may be undesirable to the operator and reduce performance and efficiency. Moreover, most conventional feller bunchers do not have swash plate-based piston motors due to increased leakage. These types of motors, however, may be used more commonly with excavators. Conventional feller bunchers may instead use bent-axis piston motors which have less leakage, but are more costly than the swash plate-based piston motors. Thus, it is desirable to use a more cost-effective motor or motors in the swing assembly 312 and wrist assembly 316, but provide a system and process for controlling leakage between the hydraulic pump and motor that induces drift.

Figure 4:
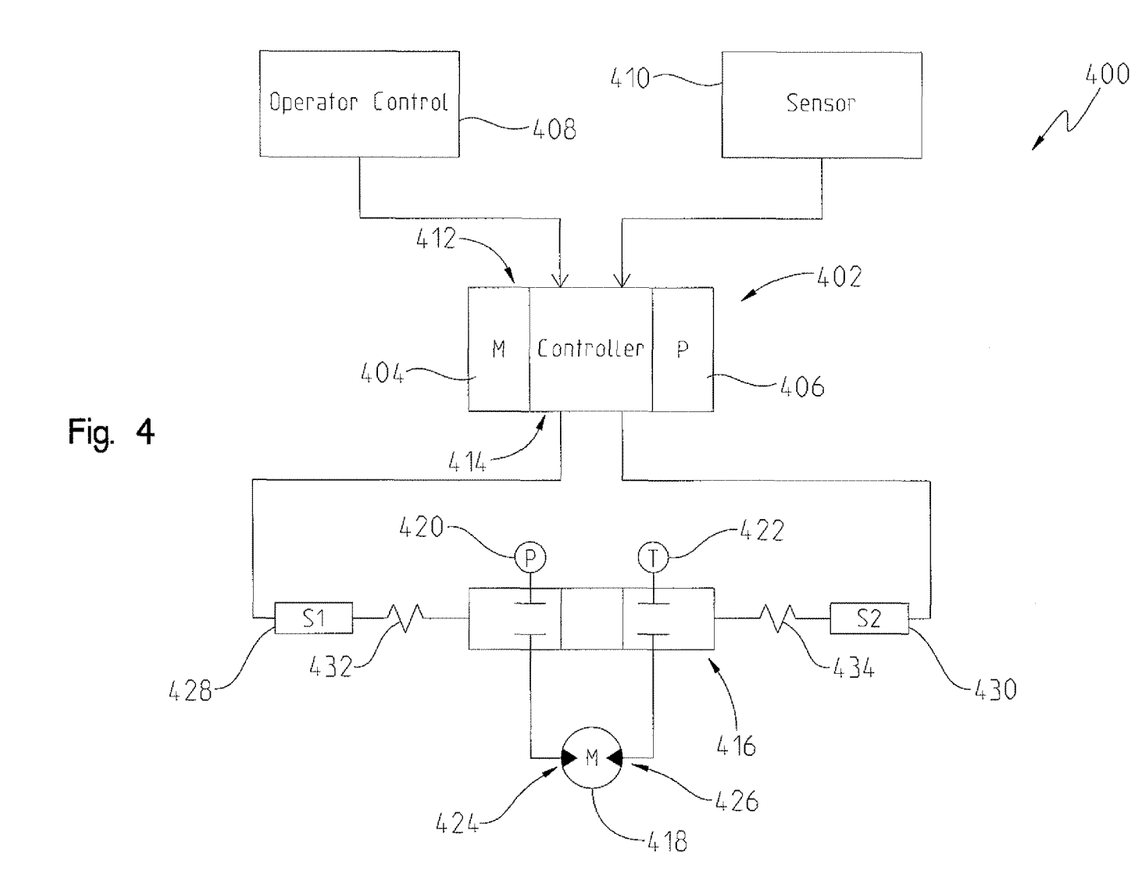
FIG. 4 is a schematic of a control system for controlling drift of a hydraulic motor of a work machine.

Referring to a different embodiment, a drift control system 400 for addressing drift in a swing assembly or wrist assembly is shown in FIG. 4. In this system 400, a controller 402 is provided for controlling the functionality of the machine 300. The controller 402 may include a memory unit 404 and a processor 406. The memory unit may be capable of storing a drift control function, which is a set of instructions executed by the processor 406 for controlling drift. Different embodiments of a drift control function are illustrated in FIGS. 6-9, which are described below.

The controller 402 may be disposed in electrical communication with an operator control 408 such as a joystick, lever, switch, pedal, and the like. The operator control 408 may be operably by the machine operator to control a swing function or wrist function. For example, if the operator control 408 is a joystick for controlling the swing assembly 312, the operator may control rotational movement of the upper frame assembly 302 of the machine 300 relative to the undercarriage assembly 304.

The operator control 408 may be in electrical communication with an input side 412 of the controller 402. An output side 414 of the controller 402 may be electrically coupled with a control spool valve 416, which is referred generally herein as a control valve. The control valve 416 may be controlled electrically by the controller 402 via a first solenoid 428 and a second solenoid 430. A first spring 432 can be disposed adjacent the first solenoid 428 at the control valve 416, and a second spring 434 can be disposed adjacent the second solenoid 430 at the control valve 416. In this system, the first and second springs are centering the valve control spool and the solenoid controlled pilot pressure is shifting the spool off center against these springs. The first and second solenoids can receive electrical current from the controller 402 to induce movement of the control valve 416.

The control valve 416 may be an electro-hydraulic control valve that is controlled electrically to provide hydraulic fluid flow to a swing or wrist motor 418. The control valve 416 may be fluidly coupled to a hydraulic pump 420 that provides hydraulic pressure, P, to drive the motor 418, and a reservoir or tank T that holds hydraulic fluid. The control valve 416 is fluidly coupled to the motor 418 via a first port 424 and a second port 426. Hydraulic fluid may flow to either the first or second port to induce rotational movement of a motor shaft (not shown).

As also shown in FIG. 4, a motor shaft sensor 410 is shown. The sensor 410 may be in electrical communication with the controller 402 to communicate information about the motor shaft. This sensor 410 may be any type of speed sensor capable of detecting rotational speed, angular distance traveled, or position. The sensor 402 may be coupled directly to the shaft as a contact-type speed sensor, or it may be a contact-less sensor or Hall Effect sensor. In other embodiments, the sensor 402 may be a Vehicle Stability Sensor (VSS) such as a John Deere F673013 Inertial Measurement Unit (IMU) that is designed to provide motion sensing using up to six (6) degrees of freedom. The VSS detects or measures the position of the cutting head or tool 318 relative to gravity.

In any event, a speed output via a speed sensor pickup may be used to communication information such as speed and direction about the motor shaft to the controller 402. In a swing assembly 312, swing motors may be arranged in parallel so that each port feeds into each motor. The motor shaft speed sensor 410 can communicate rotation or position of the motor shaft as the turntable assembly 310 moves relative to the undercarriage assembly 304.

Figure 5:
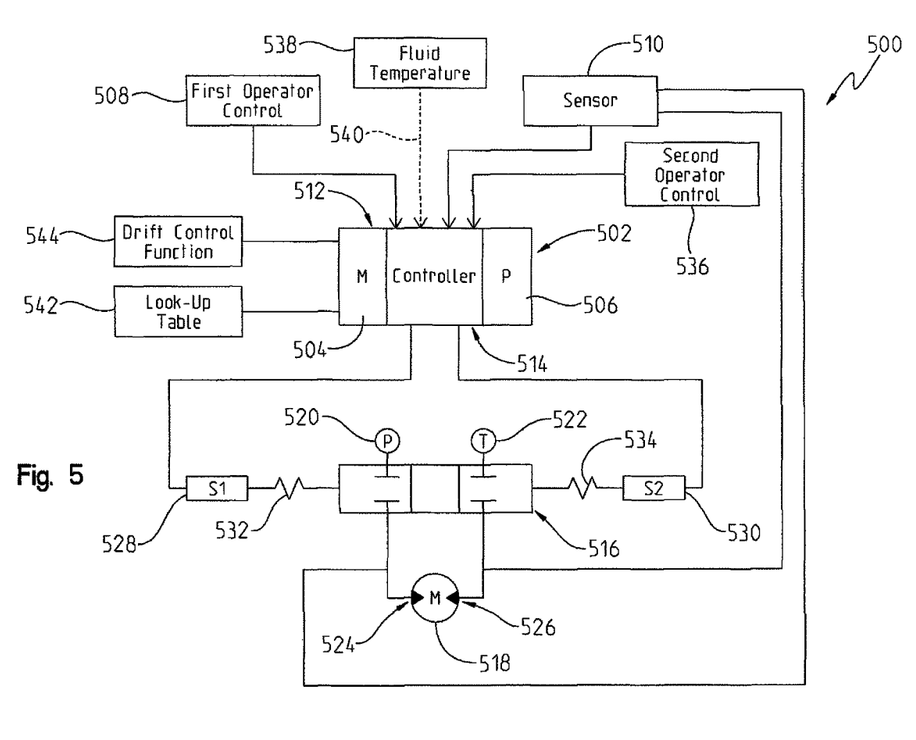
FIG. 5 is a schematic of a different control system for controlling drift of a hydraulic motor of a work machine.

In a related embodiment, another drift control system 500 is illustrated in FIG. 5. Similar to the system of FIG. 4, the control system 500 may include a controller 502 that has a memory unit 504 and a processor 506. The controller 502 further includes an input side 512 and an output side 514, and may further be in electrical communication on its input side 512 with a first operator control 508 and a sensor 510. The output side 514 may be electrically coupled to a first solenoid 528 and a second solenoid 530. Each solenoid can be energized by the controller 502 to induce movement of an electro-hydraulic control spool valve 516. The control valve 516 can be in fluid communication with a hydraulic pump 520 that supplies hydraulic pressure, P, and a tank 522 or reservoir. Hydraulic fluid can flow from the control valve 516 to a hydraulic motor 518 via a first port 524 or a second port 526. The control system 500 may further include a first spring 532 positioned between the controller 502 and first solenoid 528, and a second spring 534 positioned between the controller 502 and second solenoid 530.

In this control system 500, the memory unit 504 of the controller 502 is capable of storing a drift control function 544 that is executable by the processor 506 for controlling drift. As will be described in FIG. 8, the memory unit 504 may also store a look-up table 542 or other information for use by the controller 502 to execute the drift control function 544. In addition, a second operator control 536 may be provided for inputting a command to the controller 502. Here, the second operator control 536 may be a joystick, button, switch, lever, knob, or other means for sending an electrical signal to the controller 502. Additional controls may be provided for the machine operator to communicate with the controller 502.

In addition to controls, a fluid temperature sensor 538 may also be part of the control system 500. The sensor 538 may communicate with the controller 502 over a CAN link 540 or network to provide the controller 502 with fluid temperature readings of the machine. Fluid temperature and viscosity may be used in some drift control functions to control drift, as will be further described with respect to FIG. 8.

In FIGS. 6-9, a number of examples are provided to illustrate different drift control functions or logic to control drift or leakage in machines. While drift control is described with respect to swing motors and wrist motors of a tracked feller buncher, this disclosure is not limited to these specific motors or machine. The teachings and disclosure herein may be applied to other machines to address leakage across a control valve between a hydraulic pump and hydraulic motor.

Figure 6:
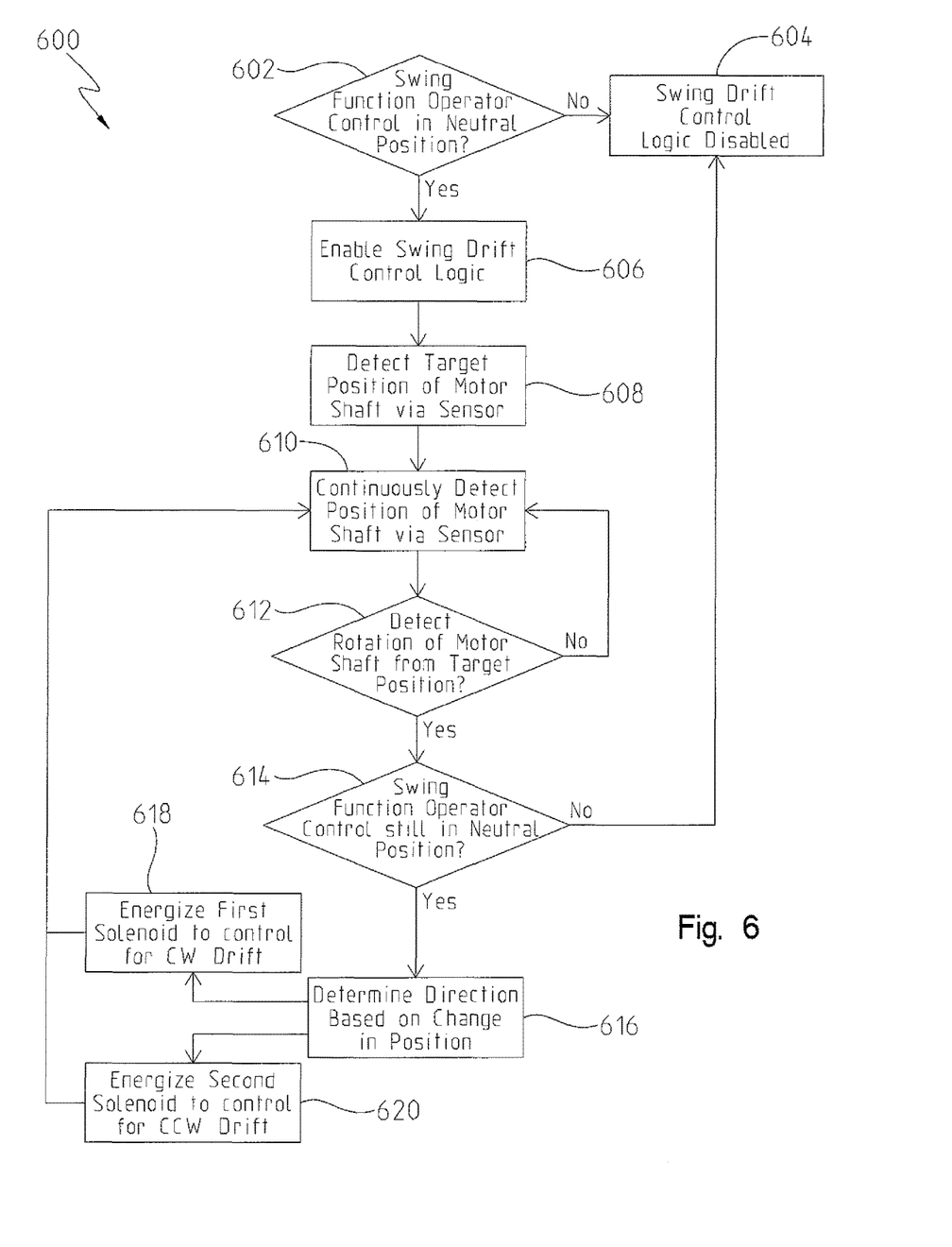
FIG. 6 is a flow diagram of a method for controlling drift of a swing motor.

Referring to FIG. 6, one example of a drift control function or method 600 is illustrated to control drift of a swing assembly 312. In this example, the drift control function 600 is executed based on a detection of position of a swing motor shaft relative to a first or threshold position. This first or threshold position may be defined as a true position of the turntable assembly 310 relative to the undercarriage assembly 304. Moreover, the function 600 is executed to detect movement of the shaft from a first position to a second position and associate this second position with a rotational direction, i.e., clockwise or counterclockwise relative to the first or threshold position. To correct for drift or movement of the motor shaft, a control system similar to the one illustrated in FIG. 4 may utilize the first solenoid 428 and the second solenoid 430. In one example, the first solenoid 428 may be energized to cause the motor shaft to rotate in a first direction, whereas the second solenoid 430 may be energized to cause the motor shaft to rotate in an opposite direction thereof.

In the method 600 of FIG. 6, the machine operator has control over when the swing drift control function is enabled. This function may be stored in the memory unit 404 of the controller 402. In block 602, drift control is not enabled unless the swing function operator control is disposed in a neutral position. Referring to FIG. 4, the swing function control 408 may be a joystick in the cab 306 which the operator uses to control rotation of the upper frame assembly 302 relative to the undercarriage assembly 304. If the operator is controlling the swing function control 408, then block 602 advances to block 604 and the swing drift control logic or function is disabled. The swing function control 408 may be based upon proportional control to vary speed and direction of rotation. If, however, the swing function control 408 is not actuated and is disposed in its neutral position, the controller 402 may detect this neutral position such that method 600 advances to block 606.

In block 606, the swing drift control function is enabled and the processor 406 may execute the one or more steps to control drift of the swing assembly 312. Once enabled in block 606, the method 600 may advance to block 608 in which the motor shaft sensor 410 detects a position of the motor shaft. This position may be communicated to the controller 402 and stored in its memory unit 404. This position may be referred to as a first or threshold position, and it is defined as the position of the motor shaft when the swing function control 408 is disposed in its neutral position. The controller 402 can continuously monitor both the position of the swing function control 408 and position of the swing motor shaft via the sensor 410 as it executes method 600. This is shown, for example, in blocks 610 and 614.

In block 610, the motor shaft sensor 410 can continuously detect the position of the motor shaft and communicate in real-time the position thereof to the controller 402. As this happens, the method 600 can advance to block 612 where the controller 402 reads the position of the motor shaft from the sensor 410, and compares the position to the first or threshold position. If the position has not changed, or if it has changed but still remains within a range or threshold amount with respect to the first or threshold position, method 600 returns to block 610 to continuously detect the position of the motor shaft. In the event, however, that the motor shaft has rotated and the new position is different from or outside of a predefined range of the first or threshold position, the method 600 can advance to block 614.

In block 614, the controller 402 can confirm that movement of the motor shaft is not a result of the machine operator manually controlling the swing function control 408. If it is a result thereof, the method 600 can advance to block 604 and the swing drift control function is disabled. However, if the swing function control 408 remains in its neutral position, method 600 can advance to block 616. In block 616, the controller can determine which direction the motor shaft rotated from the first position to the new position. This information may be supplied to the controller 402 via the motor shaft sensor 410.

In any event, once the direction is known, the controller 402 can send an electrical current to either the first solenoid 428 or second solenoid 430 to induce movement of the control valve 416, thereby correcting for any motor shaft drift. For example, current may be sent to the first solenoid 428 to induce rotation in a clockwise direction in accordance with block 618. Similarly, current may be sent to the second solenoid 430 to induce rotation in a counterclockwise direction in accordance with block 620. The amount of current may be proportional to the amount of movement detected by the sensor 410. As such, proportional control may be used to correct for swing drift. Moreover, once blocks 618 or 610 are executed, the method 600 may return to block 610 for continuous detection of motor shaft position.

Besides proportional control, feedback control may be also used. For instance, the controller may initially trigger the control valve to supply a minimal amount of hydraulic fluid to the swing motor 418. The amount of flow may gradually increase in a ramp-like manner, and the motor shaft sensor 410 may detect rotation or movement of the shaft back to its first position. In this manner, feedback is provided by the sensor 410 to the controller 402 to enable the controller 402 to increase or decrease fluid flow as necessary. The controller 402 may be programmed with data that correlates current with fluid flow so that the controller 402 can adjust the amount of current sent in blocks 618 and 620 to achieve the desired fluid flow.

Other systems may be used to compensate for drift. For instance, the swing assembly 312 may be controlled based on motor shaft speed rather than position. Thus, in block 612, the sensor 410 may communicate rotation of the motor shaft at a certain speed and direction. In turn, the controller 402 may send current to either of the first and second solenoids to trigger the control valve 416 to correct for the drift of the motor shaft. In this example, a correlation between shaft speed, current, and flow may be stored in the memory unit 404 of the controller 402 to enable the controller 402 to properly control drift.

In those instances where drift control is controlled hydraulically, the drift control function may include a maximum or cap amount of fluid that the controller 402 can trigger for the control valve 416 to release to the motor 418. This maximum or cap amount is less, in some instances by at least half, of the maximum amount of fluid required to control the swing assembly 312 during normal operation. Less hydraulic flow is required during drift in most instances because the motor shaft is rotating at a much slower pace. In any event, the maximum or cap amount of flow required as a corrective measure for drift may be designed such that it is greater than required to control drift. As a result, hydraulic flow to control for drift may be defined within a range between zero and the maximum or cap amount of flow for drift control. Thus, the controller 402 may ramp flow between the control valve 416 and motor 418 from 0 liters per minute (LPM) to a requisite amount of flow necessary to return the motor shaft to its first or threshold position. The control system 400, and specifically the controller 402, may correct for swing drift regardless of motor wear, fluid temperature, viscosity, velocity and acceleration of the motor shaft, etc. These factors may all be taken into account by measuring or detecting motor shaft speed, position, or rotational direction.

Although not shown in either FIG. 4 or 6, an optional operator control (not shown) may be provided in the cab to enable the operator to manually trigger drift control on or off. There may be some instances where the operator does not want the controller 402 to correct for swing drift, for example, and therefore may trigger a switch or other button to manually disable drift control. In some instances, a single button may be used to disable all drift control functions, and in other instances there may be a button or control for enabling or disabling each drift control function (i.e., hill hold, swing drift, wrist drift, etc.).

Figure 7:
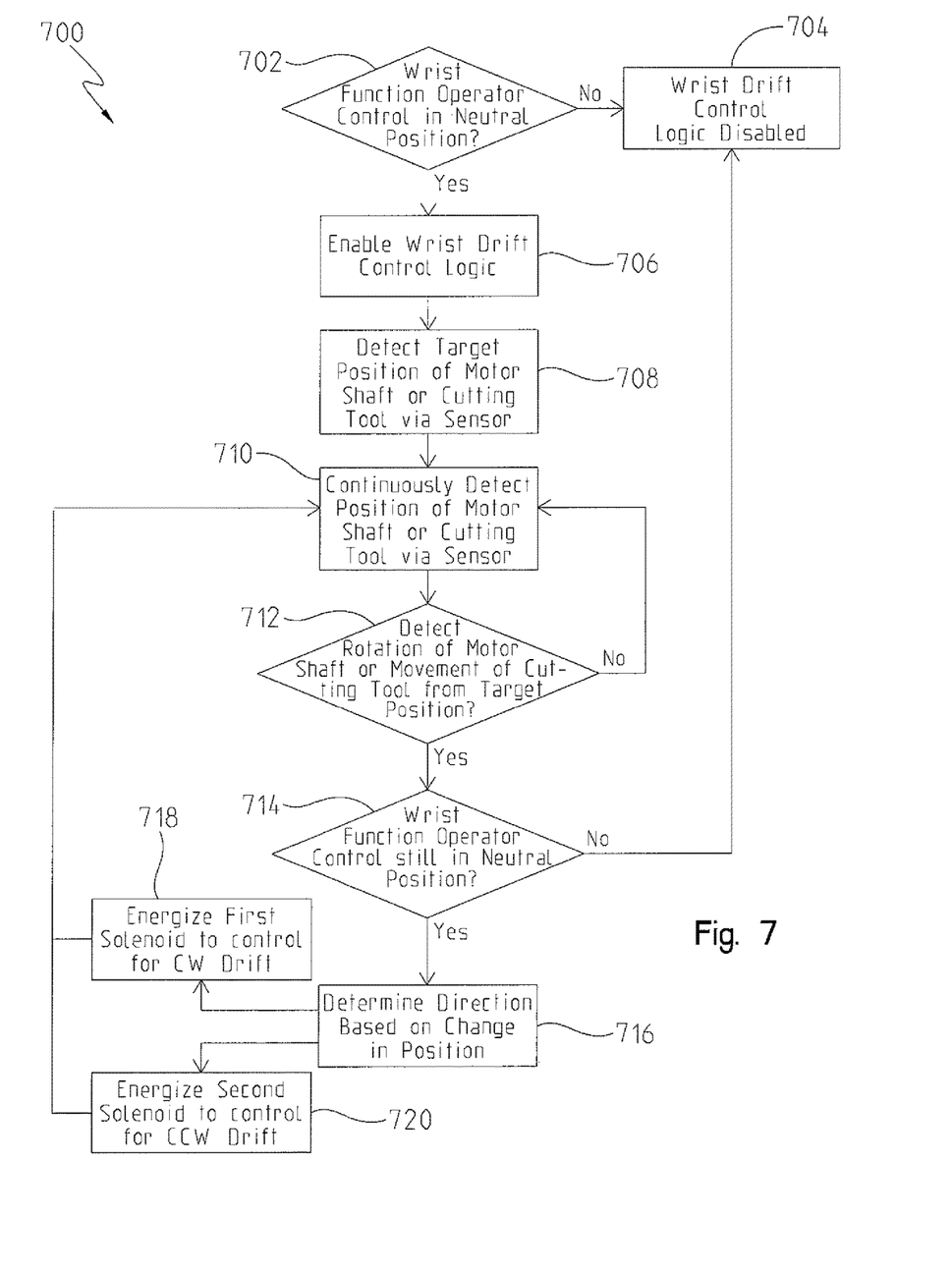
FIG. 7 is a flow diagram of a method of controlling drift of a wrist motor.

Referring to FIG. 7, a control method 700 is provided for controlling drift in the wrist assembly 316. The wrist assembly 316, similar to the swing assembly 312, may include one or more motors controlled via a hydraulic pump 420 (see FIG. 4). Leakage between the pump 420 and motor 418 may induce drift or undesirable rotation of the wrist motor. In some aspects, there may be two or more wrist motors aligned in parallel. In each case, fluid received at the first port 424 can rotatably drive the motor 418 in one direction, and fluid received at the second port 426 can rotatably drive the motor 418 in an opposite direction.

In FIG. 7, the control method 700 may be similar to the method 600 of FIG. 6. The method 700 may include a plurality of blocks executed by the processor 406 of the controller 402 to control drift in the wrist assembly 316. In a first block 702, the controller 402 determines whether the wrist function control 408 is being actuated by the operator. The wrist function 408 may be a button or similar control means disposed on a joystick or the like in the cab 306. In any event, block 702 determines whether the wrist function control 408 is in a neutral position or being controlled by the operator. If the operator is actuating the control 408, then method 700 advances to block 704 and wrist drift control function is disabled.

If the wrist function control 408 is detected to be in its neutral position in block 702, then the method 700 can advance to block 706 where the controller 402 enables wrist drift control. Wrist drift control may be logic, software, a program, function, or a set of instructions stored in the memory unit 404 of the controller 402 which are executable by the processor 406. Similar to swing drift control, the wrist drift control includes a plurality of steps for controlling drift in the wrist assembly 316.

Method 700 can advance to block 708 once wrist drift control is enabled in block 706, and the sensor 410 can detect a target or threshold position of the wrist motor shaft. The target position may be stored in the memory unit 404, and once detected, the method 700 can advance to block 710. In block 710, the sensor 410 may provide position feedback to the controller 402. The sensor 410 may provide high quality feedback to the controller 402 regarding characteristics of the motor shaft. These characteristics may include position, speed, rotational direction, etc. In some instance, even motor shaft acceleration may be detected and communicated to the controller 402.

In other instances, however, the sensor 410 may be a vehicle stability sensor (VSS) that detects a position of the cutting tool 318 relative to gravity. This position may be communicated in block 710 to the controller 402 as it relates to controlling the wrist assembly 316 of the machine 300. As a result, the position referenced above is not related to the wrist motor, but rather to the position of the cutting tool 318 and this position can be used by the controller 402 to further execute method 700.

The continuous monitoring and detection of the motor shaft (or cutting tool 318 if a VSS is used) may be executed in block 710, and the controller 402 makes a decision in block 712 whether a corrective measure is required to compensate for drift due to rotation of the motor shaft. If there is no rotation of the shaft or movement of the cutting tool, and the shaft or cutting tool remains in its target position, then the method 700 returns to block 710. If, however, there is detected rotation such that the motor shaft is no longer in its target position or within a threshold range of the target position (or the cutting tool has changed positions as detected by the VSS due to drift), method 700 can advance to block 714. In block 714, the controller 402 confirms the position of the wrist function control 408. Drift control is only active so long as the wrist function control 408 is disposed in its neutral position. If the operator has actuated the wrist function control 408, then drift control is disabled in block 704. If the operator has not actuated the wrist function control 408, and the control 408 remains in its neutral position, then method 700 advances to block 716.

In block 716, the controller 402 can determine direction of rotation of the motor shaft or how to compensate for movement of the cutting tool 318 relative to gravity based on the detected rotation or movement information provided by the sensor 704. If the direction or movement corresponds with a first direction, e.g., a clockwise drift, then block 718 is executed and the controller 402 electrically communicates with the first sensor 428 to induce movement of the control valve 416. If the direction corresponds with a second direction, e.g., a counterclockwise drift, then block 720 is executed and the controller 402 electrically communicates with the second sensor 430 to induce movement of the control valve 416. The hydraulic control of the wrist motor may be similar to that described above with respect to the swing motor. After either blocks 718 or 720 are executed, method 700 advances to block 710 to continuously monitor potential drift in the wrist assembly 316.

As described above, when the vehicle stability sensor 410 is used, the output from the sensor 410 to the controller 402 includes a position of the cutting head or tool 318 relative to gravity and the controller 402 may determine which direction (e.g., clockwise or counterclockwise) to hydraulically control the wrist motor to correct for movement of the cutting tool. If a clockwise direction is determined, then the controller 402 can take the necessary steps to energize either the first solenoid 428 or second solenoid 430 to rotate the shaft in the counterclockwise direction (i.e., the direction opposite of that detected).

In another example, a contact-type linear or rotary position sensor (e.g., rotary encoder) may detect rotation of the motor shaft and communicate said rotation to the controller 402. The sensor 410 may be mounted or coupled directly to the motor shaft in at least one embodiment. In other example, non-contact sensors (e.g., Hall Effect sensors) that do not require a direct mounting or coupling to the motor shaft may be used. In some instances, the sensor 410 may provide feedback to the controller 402 of a position of the motor shaft relative to a threshold position when the operator control 408 is in its neutral position. In other instances, the sensor 410 can detect a position of the machine (i.e., one location or part of the wrist assembly 316 to another part such as the cutting tool 318) relative to a threshold position. This is different from the vehicle stability sensor described above, which is based upon detecting position of the cutting head or tool 318 relative to gravity.

In the hydraulic control of the electro-hydraulic spool valve 416, control of a hydraulic spool through the use of pilot oil or fluid may move the spool valve against a spring. The aforementioned solenoids can control the pilot oil flow. Thus, if current or a pulse-width modulation is sent to the first solenoid 428, the control valve 416 will move to release flow to induce rotation of the wrist motors in a particular direction. The same is true with the second solenoid 430 except for opposite direction control. In any event, leakage in the wrist motors can be effectively controlled or corrected by use of the drift control systems of FIGS. 4 and 5.

Figure 8:
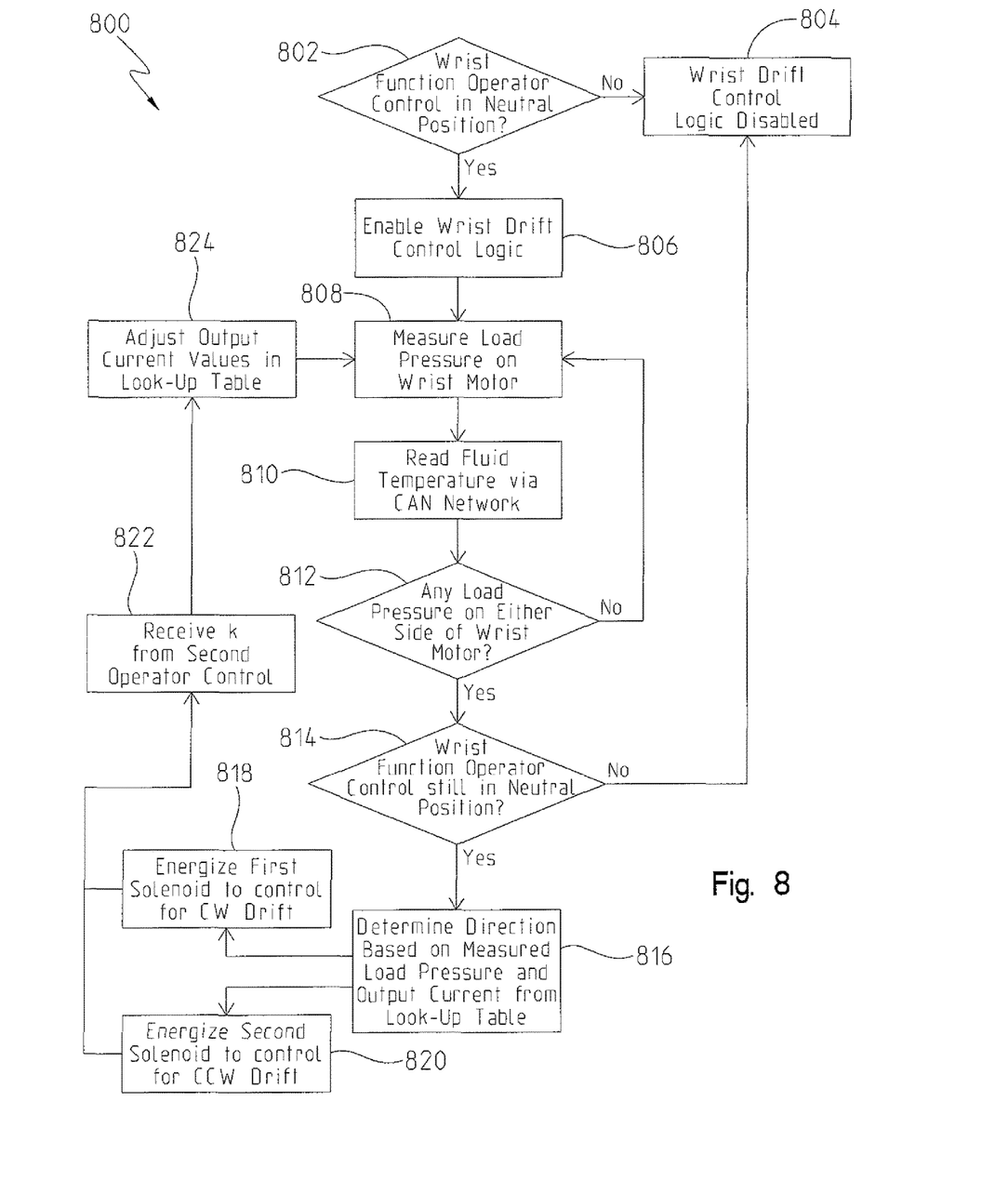
FIG. 8 is another flow diagram of a method of controlling drift of a wrist motor.

Referring to FIG. 8, a different control method 800 is illustrated. Here the control method 800 takes the form of a predictive, forward control process. The method 800 is illustrated as not including feedback control, but feedback control is possible in other embodiments. The control system 500 of FIG. 5 may be used for executing the method 800. The method 800, like the methods of FIGS. 6 and 7, may include a plurality of steps or blocks that are executed by the processor 506 of the controller 502. In block 802 of the method 800, the controller 502 can detect if the wrist function control 508 is in the neutral position. This is similar to block 702 of FIG. 7. If the wrist function control 508 is in neutral, the method advances to block 806 and if it is not then the method advances to block 804 where wrist drift control is disabled.

In block 806, however, wrist drift control function 544 is enabled. The function 544 may be stored in the memory unit 504 of the controller 502 as described above. Once enabled, the method 800 advances to block 808 where a pressure sensor 510 on the wrist motor work lines outputs pressure signals to the controller 502. Here, the pressure sensor 510 can measure load pressure on the wrist motor and communicate said pressure to the controller 502.

As described above, a look-up table 542 may be stored in the memory unit 504 of the controller 502. Predefined data or information may be stored in the look-up table 542, and this data or information may include output currents relative to load pressure and hydraulic fluid temperature. Thus, once block 808 is executed, method 800 advances to block 810 where fluid temperature is read by the controller 502 over a CAN or similar link 540. Fluid temperature may be measured by a fluid temperature sensor 538 or the like. Once fluid temperature is communicated to the controller 502, the method advances to block 812 where a determination is made whether there is any load pressure on either side of the wrist motor 518. If there is no load pressure detected in block 812, then method 800 returns to block 808 to continuously measure load pressure on each side of the wrist motor 518.

In block 812, if there is load pressure detected on either side of the wrist motor 518, method 800 advances to block 814 to determine whether the operator has triggered or moved the wrist function control 508. If so, then method 800 returns to block 804 and wrist drift control is disabled. If, however, the wrist function control 508 is still in neutral, method 800 advances to block 816 where the controller 502 determines the rotational direction of movement of the motor shaft based on the measured load pressure, fluid temperature, fluid viscosity (which may be determined from temperature) and output current from the look-up table 542.

To correct or compensate for drift in the wrist assembly 316, the controller 502 may electrically communicate with one or both of the first solenoid 528 and the second solenoid 530. For example, in block 818, the controller 502 can energize the first solenoid 528 to control for clockwise drift. Likewise, in block 820, the controller 502 can energize the second solenoid 530 to control for counterclockwise drift. The amount of current sent to each solenoid is determined from the look-up table 542 in block 816. In this illustrated example, there may not be any feedback control so the amount of current communicated to either solenoid may instantly correspond to the amount of movement of the wrist motor shaft. Thus, this may not be ramping hydraulic fluid to the motor to correct for drift, but is more of an immediate corrective measure.

In other example, there may be feedback control. In FIG. 8, for example, method 800 can advance to block 808 after executing blocks 818 or 820. As such, load pressure may be continuously measured at each of the motor and drift may be continuously compensated.

In another example, the machine operator may have a second operator control 536 that allows the operator to control the amount of current sent to each solenoid. The second operator control may adjust output current values in the lookup table 542 via execution of blocks 822 and 824. Here, a k factor may be initially set to 1.0, but the second operator control 536 can allow the operator to adjust the k factor to either increase or decrease the amount of current sent to the solenoids. Thus, if the operator desires more current, the second operator control 536 can be actuated to adjust the k factor to something greater than 1.0 (e.g., 1.05, 1.2, etc.). Alternatively, if too much current is being communicated to the solenoids, the k factor may be decreased so that output currents in the look-up table 542 are reduced based on a load pressure measurement and fluid temperature reading.

Figure 9:
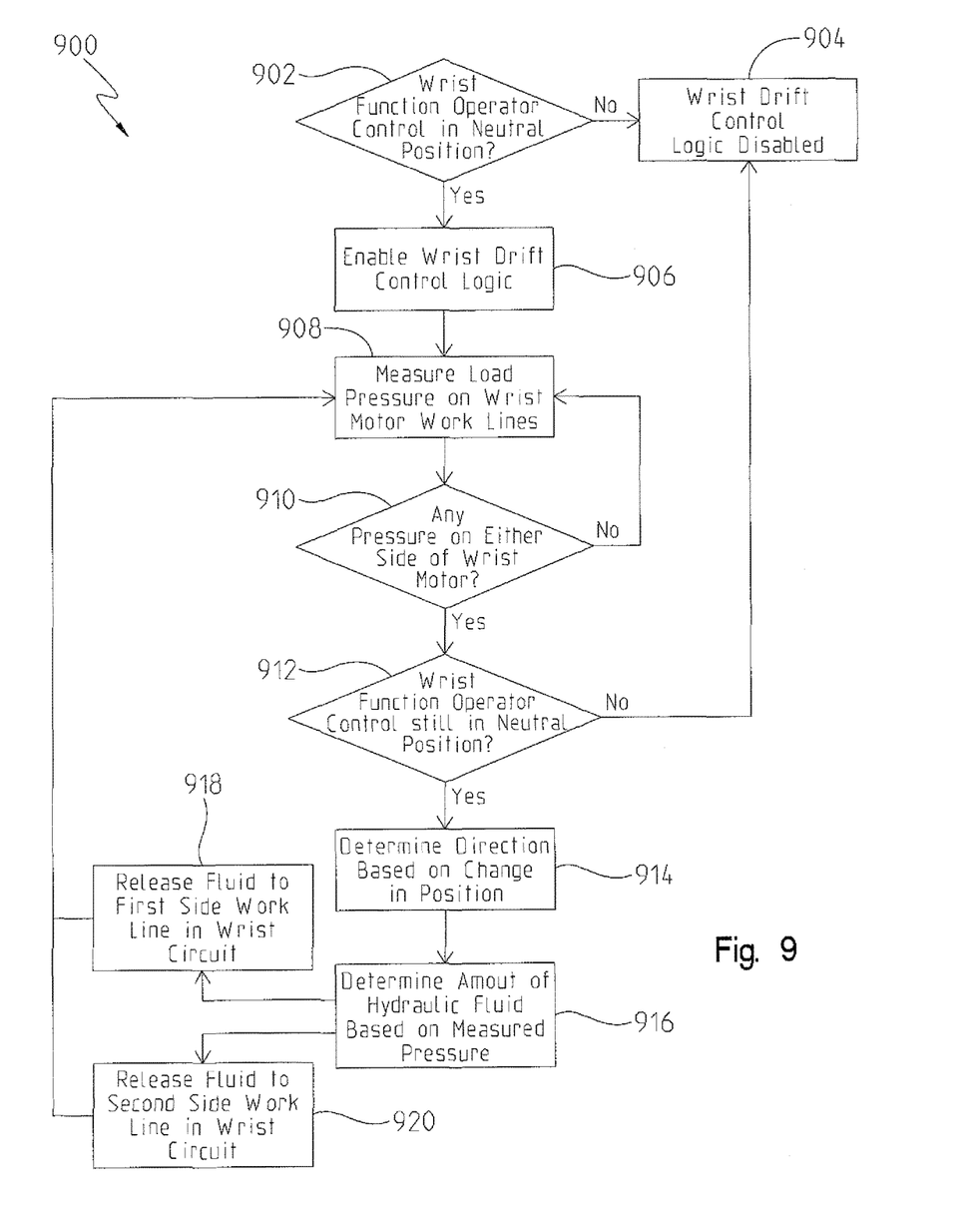
FIG. 9 is a different flow diagram of a method of controlling drift of a wrist motor.

Another example of controlling drift or motor leakage in the wrist assembly 316 is illustrated in FIG. 9. In FIG. 9, a method 900 for controlling drift includes a number of blocks or steps that are executable by the processor 506 of the controller 502. In FIG. 9, blocks 902, 904 and 906 are similar to blocks 802, 804, and 806. The controller 502 first determines if the wrist function control 508 is in neutral in block 902, and if so, method 900 enables drift control in block 906, and if not, method 900 disables drift control in block 904.

If wrist drift control is enabled in block 906, the method 900 advances to block 908 where the sensor 510 measures load pressure on wrist motor work lines similar to that in block 808. The controller 502 further determines in block 910 if there is load pressure on either side of the wrist motor 518, and if so, then method 900 advances to block 912. If not, then method 900 returns and executes block 908 again.

In block 912, the controller 502 detects if the wrist function control 508 is still in neutral, and if so, then method 900 advances to block 914. If the wrist function control 508 is not actuated by the operator such that it is not in neutral, then method 900 returns to block 904 and disables wrist drift control. If wrist function control 508 is still in neutral, then in block 914 the controller 502 determines rotational direction of the motor shaft based on the work line pressure signals in blocks 908 and 910. Once rotational direction is known, method 900 advances to block 916 where the controller determines an amount of hydraulic flow required to correct for drift based on the measured pressure. Once the amount of hydraulic flow is determined in block 916, the method advances to blocks 918 or 920 where the control valve 516 releases the previously determined hydraulic flow to either the first side work line in the wrist circuit or the second side line. Whichever line receives the hydraulic flow will induce rotation to correct for the drift.

Method 900 can return to block 910 to continue measuring pressure on either side of the wrist motor so that drift may continuously be corrected. Unlike previous examples, however, electronic control is not used in this example to compensate for leakage. Thus, the solenoids in FIG. 5 may not be present in a control system that executes the drift control method 900 of FIG. 9.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains.

We claim:

1. A drift control method for a machine, the machine including a controller, a cutting tool, a motor having a motor shaft for driving a machine function, a control valve, and an operator control for commanding a machine function, the drift control method comprising:
    sensing a neutral position of the operator control;
    storing a drift control function and a look-up table in the controller, the look-up table including electric current values relative to a load pressure on the motor; and
    performing the following steps while the operator control is sensed in the neutral position:
        storing a first position of the motor shaft or cutting tool in the controller;
        detecting a change in position of the motor shaft or cutting tool with a sensor;
        determining a direction as a function of the change in position;
        enabling the drift control function using the look-up table to execute the performing step if the operator control is in the neutral position; and
        hydraulically controlling the motor shaft or cutting tool to the first position.

2. The drift control method of claim 1, further comprising:
    sensing the operator control is in a position different from the neutral position; and
    disabling the drift control function.

3. The drift control method of claim 1, further comprising:
    continuously measuring the position of the motor shaft or cutting tool while the operator control is in the neutral position; and
    continuously adjusting the position of the motor shaft or cutting tool to remain substantially in the first position.

4. The drift control method of claim 1, further comprising:
    providing a first solenoid to control rotation of the motor shaft in a clockwise direction and a second solenoid to control rotation in a counterclockwise direction; and
    energizing the first solenoid or the second solenoid based on a result of the determining step.

5. The drift control method of claim 4, further comprising:
    actuating the control valve in one of two directions based on the energizing step;
    detecting a new position of the motor shaft or cutting tool after the actuating step;
    comparing the new position to the first position;
    determining a second direction if the new position is different from the first position; and
    hydraulically controlling the motor shaft or cutting tool from the new position to the first position.

6. The drift control method of claim 1, wherein the hydraulically controlling step comprises hydraulically controlling motor shaft speed based on a magnitude of the change in position of the motor shaft.

7. The drift control method of claim 1, wherein the hydraulically controlling step comprises hydraulically controlling motor shaft speed based on one or more of a magnitude of the change in position of the motor shaft, actual fluid temperature relative to a threshold temperature, and load pressure on a work line of the motor.

8. The method of claim 1, wherein the storing the drift control function step includes storing a look-up table including a fluid temperature.

9. A method of controlling motor shaft drift due to fluid leakage of a machine, comprising:
    providing a controller, a control valve having a first solenoid and a second solenoid, a motor having a motor shaft for driving a machine function, a sensor, and an operator control for commanding the machine function;
    storing a look-up table in the controller, the look-up table including electric current values relative to a load pressure on the motor;
    detecting a neutral position of the operator control;
    sensing rotation of the motor shaft in a first rotational direction with the sensor;
    receiving a pressure signal from the sensing step;
    determining an output current from the look-up table based on the pressure signal; and
    electrically controlling the control valve based on the determined output current from the look-up table to rotate the motor shaft in a second rotational direction, where the first rotational direction is opposite the second rotational direction.

10. The method of claim 9, wherein:
    the sensing step comprises sensing rotation of the motor shaft in the first rotational direction by an angular distance; and
    the electrically controlling step comprises electrically controlling the control valve to rotate the motor shaft in the second rotational direction by the angular distance.

11. The method of claim 10, wherein the electrically controlling step comprises:
    comparing the angular distance to a threshold distance; and
    electrically controlling the control valve to rotate the motor shaft in the second rotational direction by the angular distance when the angular distance is greater than the threshold distance.

12. The method of claim 10, wherein:
    the sensing step comprises sensing rotation of the motor shaft in the first rotational direction by a first angular distance; and
    the electrically controlling step comprises electrically controlling the control valve to rotate the motor shaft in the second rotational direction by a second angular distance, the second angular distance being equal to or within approximately 90% of the first angular distance.

13. The method of claim 9, further comprising:
    continuously monitoring the motor shaft after the electrically controlling step;
    detecting rotational movement of the motor shaft in either the first or second direction; and
    commanding the control valve to control movement of the motor shaft in the direction opposite of the rotational movement.

14. A method of controlling motor shaft drift due to fluid leakage of a machine, comprising:
    providing a controller, a control valve having a first solenoid and a second solenoid, a motor having a motor shaft for driving a machine function, a sensor, and an operator control for commanding the machine function;

detecting a neutral position of the operator control;

sensing rotation of the motor shaft in a first rotational direction with the sensor;

electrically controlling the control valve to rotate the motor shaft in a second rotational direction, where the first rotational direction is opposite the second rotational direction;

storing a look-up table in the controller, the look-up table including electric current values relative to a load pressure on the motor and a fluid temperature;

receiving a pressure signal from the sensing step;

reading a current fluid temperature over a CAN link;

determining an output current from the look-up table based on the pressure signal and current fluid temperature; and communicating the output current to a first solenoid or a second solenoid to execute the electrically controlling step.

15. The method of claim 14, wherein:

the sensing step comprises detecting a movement in a first direction of a cutting tool of the machine with the sensor; and the electrically controlling step comprises controllably moving the cutting tool in a second direction, wherein the first direction is opposite the second direction.

16. A method for controlling drift of a work machine, the work machine including a controller, a control valve having a first solenoid and a second solenoid, a motor having a motor shaft for driving a machine function, a motor shaft sensor, a pressure sensor, and an operator control for commanding the machine function, the method comprising:

storing a drift control function and a look-up table in the controller, the look-up table including electric current values relative to a load pressure on the motor and a fluid temperature;

enabling the drift control function if the operator control is in a neutral position;

receiving a pressure signal from the pressure sensor at a work line on the motor indicative of rotation of the motor shaft in a first direction;

determining an output current from the look-up table based on the pressure signal and a current fluid temperature;

communicating the output current to a first solenoid or a second solenoid; and controlling the control valve to rotate the motor shaft in a second direction, where the first direction is opposite the second direction.

17. The method of claim 16, further comprising:

storing a maximum drift threshold in the controller;

detecting rotation of the motor shaft with the sensor;

determining a magnitude of change in position of the motor shaft during the detecting step; and continuously comparing the magnitude of change with the threshold.

18. The method of claim 17, further comprising hydraulically controlling motor shaft speed based on the magnitude of change in position of the motor shaft if the magnitude of change exceeds the threshold.

19. The method of claim 16, wherein the receiving step comprises:

detecting fluid pressure at the work line of the motor with the pressure sensor;

comparing the fluid pressure to a pressure threshold; and executing the controlling step if the fluid pressure exceeds the pressure threshold.

20. The method of claim 16, further comprising:

providing a second operator control in electrical communication with the controller;

receiving a command from the second operator control; and adjusting the electric current values in the look-up table based on the command.

* * * * *